Figure 1:
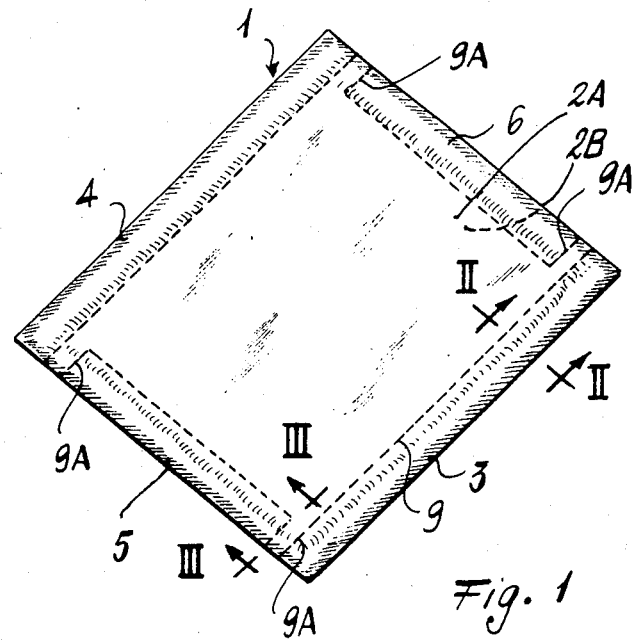

United States Patent [19]

Moretti

[11] Patent Number: 4,662,521
[45] Date of Patent: May 5, 1987

[54] THERMAL INSULATION BAG FOR VACUUM-PACKAGING MICROPOWDER MATERIALS

[75] Inventor: Franco Moretti, Varese, Italy

[73] Assignee: U.S. Philips Corporation, New York, N.Y.

[21] Appl. No.: 843,895

[22] Filed: Mar. 25, 1986

[30] Foreign Application Priority Data

Mar. 29, 1985 [IT] Italy ............... 21280/85[U]

[51] Int. Cl.$^4$ .......................................... B65D 73/00
[52] U.S. Cl. ................... 206/484.2; 206/484; 206/524.8
[58] Field of Search ............ 206/484, 484.1, 484.2, 206/524.8

[56] References Cited

U.S. PATENT DOCUMENTS

| 4,014,433 | 3/1977 | Cerwin | 206/484 |
| 4,135,022 | 1/1979 | Glick | 206/484 |
| 4,236,652 | 12/1980 | Beguhn | 206/484 |
| 4,268,531 | 5/1981 | Whiting, Jr. | 206/484 |

FOREIGN PATENT DOCUMENTS 164793 12/1985 European Pat. Off. .
145678 8/1983 Japan .

Primary Examiner—Joseph Man-Fu Moy
Attorney, Agent, or Firm—Rolf E. Schneider

[57] ABSTRACT

A thermal insulating unit includes a sealed inner gas-permeable bag containing an insulating micropowdered material, such inner bag having two major surfaces parallel to each other. Two multilayer sheets are respectively disposed on opposite sides of the gas-permeable bag and overlap the same, each sheet being formed of an innermost layer and an outermost layer of a thermoweldable plastic and an intermediate metal layer. The metal layer has smaller dimensions than the plastic layers such that each metal layer wholly covers only its corresponding inner-bag major surface. The four plastic layers are peripherally heat-sealed, the resulting outer bag having been evacuated. A device is provided on each metal layer for fixing such layer to and positioning it with respect to its respective two plastic layers.

4 Claims, 4 Drawing Figures

THERMAL INSULATION BAG FOR VACUUM-PACKAGING MICROPOWDER MATERIALS

This invention relates to a thermal insulating bag or unit for a micropowdered material comprising at least one multilayer sheet, each sheet being formed of an innermost layer and an outermost layer of a thermoweldable plastic and an intermediate metal layer.

Such an insulating bag is known from published Japanese patent application No. 58-145,678. To produce this insulating bag first a paper bag is filled with a micropowder (for example perlite) at atmospheric pressure and is closed by means of adhesive tape. The paper bag is permeable to gases but not to the micropowder. Then the closed paper bag is put into a thermoweldable flexible bag impermeable to gases, a vacuum is applied to the resultant assembly, and the flexible bag is sealed by thermowelding its edges while maintaining the vacuum. This thermoweldable bag is formed of a multi-layer laminated material including a metal layer which is impermeable to gases and an innermost layer of a thermoweldable plastic material. Other methods of constructing thermal insulating bags in which siliceous micropowders are vacuum-packaged into thermoweldable flexible containers of three or more layers, with an intermediate metal layer (aluminium) and an innermost layer of a thermoweldable plastic are described in published European patent application No. 164,793.

In all these known containers, the constituent layers, and thus also the metal (aluminium) layer which has a good thermal conductivity, have the same dimensions. At the thermal welds or in proximity thereto the facing edges of the metal layers are very close to each other. When used in refrigerators, for example domestic refrigerators, these insulating bags are embedded in a foamed polyurethane mass which together with these insulating bags constitutes the refrigerator insulation. Between the two facing sides of the insulating bag there is a temperature difference, because one side faces the cold refrigeration chamber and the other side faces the relatively warm environment. It has been found that there is thermal leakage from one side to the other side of the insulating bag due to the close proximity of the metal layers along the edges.

It is an object of the present invention to provide a thermal insulating bag of improved construction which at least partly mitigates the aforesaid disadvantages.

According to the invention this object is accomplished in that the metal layer has smaller dimensions than the plastic layers such that when the paper bag filled with the micropowdered material is inserted into the flexible bag, the metal layer wholly covers only the major surfaces of the paper bag where said major surfaces extend substantially parallel to each other.

Preferably, each metal layer is fixed to the two layers of plastic material. This prevents the metal layer from shifting with respect to the plastic layers, especially during manufacture of the insulating bag, it facilitates insertion of the power-filled paper bag. Fixing can be done by, for example, spot-welding.

In a preferred embodiment of the invention, comprising two multi-layer sheets sealed together at their respective peripheral edges, each metal layer is provided with tabs for fixing the metal layers to and positioning them with respect to the other respective plastic layers, said tabs extending up to the peripheral edges of the plastic layers. The metal layers are positioned with respect to the respective plastic layers with the aid of the tabs and then the plastic layers are sealed together along their peripheral edges, the tabs being sealed between the plastic layers. Although the tabs are now very close to each other and cause local heat conduction, resulting in some heat leakage and thus reduction of insulating properties, this leakage is very small and the disadvantage of this minor leakage is amply offset by the advantage of easy and inexpensive positioning and fixing of the metal layers with respect to the respective plastic layers.

In another preferred embodiment of the invention, comprising a single multi-layer sheet which is folded in half and the free edges of which are sealed together, the metal layer is formed with an aperture at the location of the folding area, which aperture is so arranged that the facing substantially parallel metal layer parts are connected to each other by narrow strip portions at the folding area, and that at the sides which are remote from the folding area the metal layer includes tabs for fixing and positioning it with respect to the plastic layers, said tabs extending up to the peripheral edges of the plastic layers. In addition to the advantages of the first preferred embodiment this embodiment has the advantage that there is only one multi-layer sheet.

Figure 2:
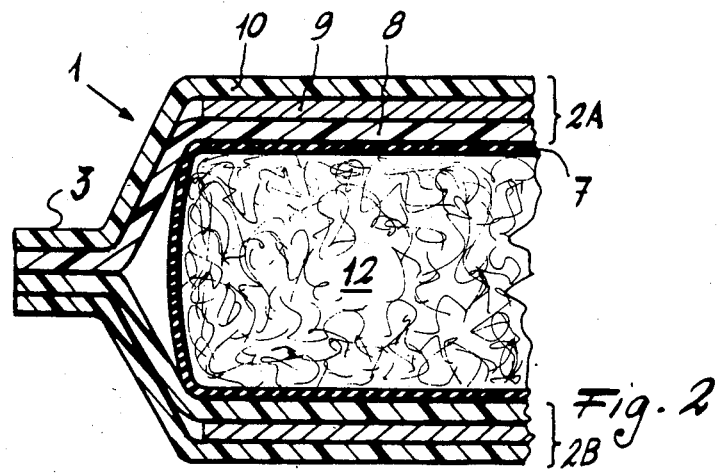
Figure 3:
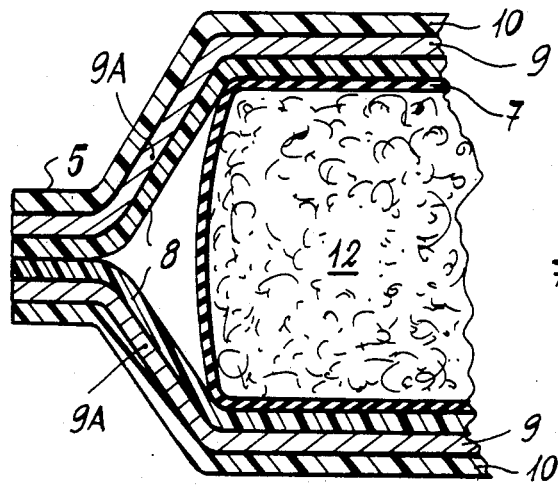
Figure 4:
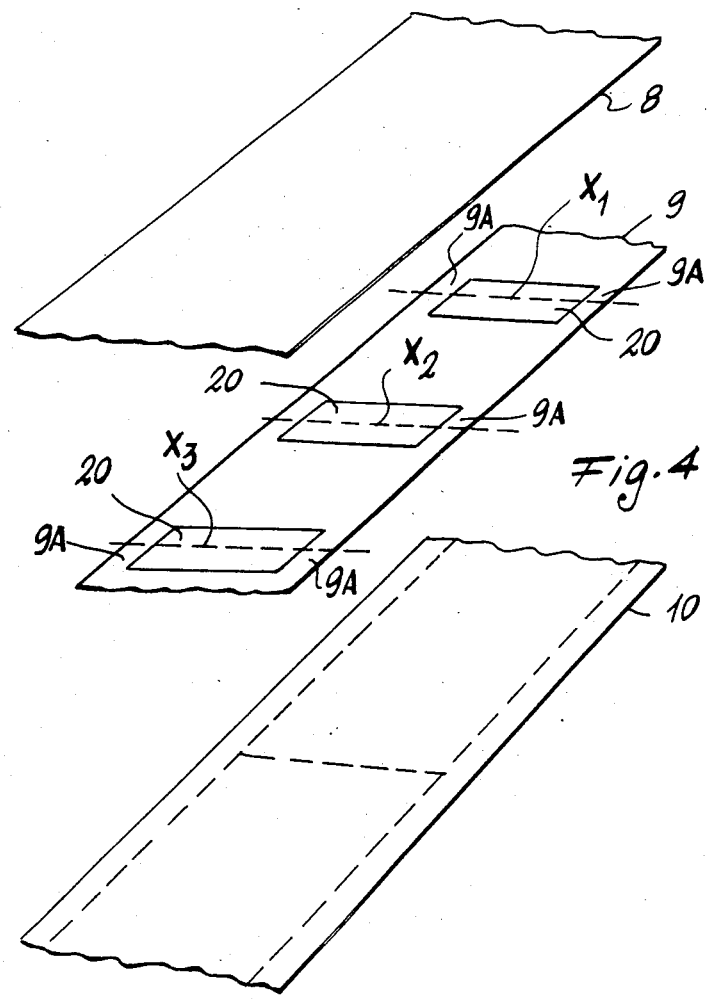

The invention will now be described in more detail with reference to the accompanying drawings, in which:

FIG. 1 is a diagrammatic perspective view of a thermal insulating bag formed in accordance with the invention, FIG. 2 is an enlarged scale cross-sectional view of the sealed edge of the bag taken on the line II—II of FIG. 1, FIG. 3 is an enlarged scale cross-sectional view of such sealed edge of the bag taken on the line III—III of FIG. 1, and FIG. 4 is a perspective diagrammatic and exploded view of the three separate layers, cutting lines being indicated in the intermediate metal layer.

With reference to the drawings, a flexible thermal insulating bag, indicated by the reference numeral 1, is formed from two equal, for example rectangular, superposed multilayer sheets 2A, 2B, which are initially thermowelded along three edges, for example along the two longitudinal edges 3, 4 and a transverse edge 5. In FIG. 1 the sealed edges of the flexible bag are indicated by hatching. The fourth edge, indicated by 6, is still open to enable a closed paper bag 7 containing a mass 12 of a siliceous insulating micropowder, for example perlite, to be inserted therethrough. The paper bag is permeable to gases but not to the micropowder. After insertion, the flexible bag 1 is put under vacuum and closed by a thermal weld along the open edge 6. This thermal weld is also indicated by hatching in FIG. 1.

As stated the flexible insulating bag 1 is formed from two equal-size sheets 2A, 2B. These sheets are in the form of a multi-layer laminate comprising an innermost layer 8 of polyethylene (for example having a thickness of 50$\mu$), an intermediate layer 9 of aluminium (for example having a thickness of 9$\mu$), and an outermost layer 10 of polyester (for example having a thickness of 12$\mu$).

The intermediate metal layer 9 (of which the periphery is shown by the broken lines in FIG. 1) has smaller dimensions than the two plastic layers 8, 10 and is centred relative to the last-mentioned layers as can be seen in FIG. 1. The position of the metal layer is such that when the paper bag filled with the micropowder is inserted into the flexible bag the metal layer covers the major surfaces of the paper bag where said major surfaces extend substantially parallel to each other (see FIG. 2), with the exception of four small tabs 9A which are used for positioning the metal layer 9 with respect to the other respective plastic layers 8, 10. The tabs 9A are sealed between the edges of the layers 8, 10 (see FIG. 3).

In production the respective layers are unwound from separate reels. Parts of the unwound layers are shown in FIG. 4. The metal layer 9 has a smaller width than the plastic layers. At equal distances rectangular apertures 20 are formed in metal layer.

Upon cutting the metal layer along the lines $X_1$, $X_2$, $X_3$, . . . across the middle of the apertures 20, the separate metal layer parts including the tabs 9A, as shown in broken lines in FIG. 1, are obtained. These metal layer parts are meant for a flexible insulating bag made of two multi-layer sheets.

By cutting the metal layer 9 along the lines $X_1$, $X_3$, . . . only, metal layer parts are obtained which comprise an aperture 20 in the middle and tabs 9A at the cut edges. After sealing such a metal layer part to the corresponding innermost and outermost plastic layer parts the resultant multi-layer sheet is folded in half and the two opposite free edges (like 3 and 4 in FIG. 1) are sealed together. In this way a flexible bag is obtained which is open at one side, for inserting the micropowder filled paper bag, the substantially facing parallel metal layer parts being connected to each other by narrow strip portions formed by two tabs 9A at the folding area. In this case the thermal insulating bag is made from only one multi-layer sheet and one sealing operation is eliminated.

What is claimed is:

1. A thermal insulating unit which comprises a sealed inner gas-permeable bag containing an insulating micropowdered material, said inner bag having two major surfaces parallel to each other; two multilayer sheets respectively disposed on opposite sides of said gas-permeable bag and overlapping the same, each sheet being formed of an innermost layer and an outermost layer of a thermoweldable plastic and an intermediate metal layer; the metal layer having smaller dimensions than the plastic layers such that each metal layer wholly covers only its corresponding inner-bag major surface; the four plastic layers being peripherally heat-sealed, the resulting outer bag having been evacuated; and means on each metal layer for fixing such layer to and positioning it with respect to its respective two plastic layers.

2. A thermal insulating unit according to claim 1, in which the fixing and positioning means on each metal layer comprises at least one tab extending between the sealed peripheral portions of its respective two plastic layers.

3. A thermal insulating unit according to claim 2, in which the oppositely disposed multilayer sheets are rectangular, and in which the fixing and positioning means on each metal layer comprises a tab at each corner extending between the sealed peripheral portions of its respective two plastic layers.

4. A thermal insulating unit according to claim 1, in which the two multilayer sheets each comprise half of a folded single multilayer sheet; the metal layer is formed with an aperture at the folding area to provide two connecting strip portions; and the two ends of the metal layer remote from the folding area are each formed with at least one tab extending between the sealed peripheral portions of the respective plastic layers.

* * * * *